United States Patent [19]

Penrose

[11] 4,002,854
[45] Jan. 11, 1977

[54] LOUDSPEAKING TELEPHONE INSTRUMENTS

[75] Inventor: David John Penrose, Darlington, England

[73] Assignee: The General Electric Company Limited, London, England

[22] Filed: Sept. 22, 1975

[21] Appl. No.: 615,504

[30] Foreign Application Priority Data

Sept. 27, 1974 United Kingdom ............ 42099/74

[52] U.S. Cl. .......................... 179/81 B; 179/1 HF
[51] Int. Cl.² ................................. H04M 9/08
[58] Field of Search ............ 179/81 B, 1 VC, 1 P, 179/1 H, 1 HF, 1 SW; 328/137, 146, 154

[56] References Cited

UNITED STATES PATENTS

| 2,964,598 | 12/1960 | Parker | 179/81 B |
|---|---|---|---|
| 3,075,045 | 1/1963 | Clemency | 179/81 B |
| 3,725,585 | 4/1973 | Moniak | 179/81 B |
| 3,876,835 | 4/1975 | Barnaby | 179/1 VC |

Primary Examiner—William C. Cooper
Assistant Examiner—Joseph A. Popek
Attorney, Agent, or Firm—Kirschstein, Kirschstein, Ottinger & Frank

[57] ABSTRACT

In a loudspeaking telephone arrangement using voice switching a closed-loop circuit is used to apply an averaged rectified ambient-noise signal to the comparator from one or both channels to enable proper voice switching regardless of ambient noise levels or line length.

7 Claims, 2 Drawing Figures

LOUDSPEAKING TELEPHONE INSTRUMENTS

The present invention relates to loudspeaking telephone instruments.

In particular the invention is concerned with loudspeaking telephone instruments including voice switching arrangements. In such instruments signals derived from the send path, between the microphone and the hybrid transformer of the instrument, and the receive path, between the hybrid and the loudspeaker of the instrument, are rectified and compared to determine which path is carrying the higher signal level. In dependence upon the output of the comparator attenuator means are switched in one or other of the send and receive paths, usually the path with the lower level signals, to avoid the risk of "howl-round" due to the high amplifier gain provided in the send and receive paths.

According to the present invention in a loudspeaking telephone instrument including a voice switching arrangement by means of which in operation signals on a send path or a receive path selectively are substantially attenuated in dependence upon the relative amplitudes of the voice frequency signals appearing on said paths, the voice switching arrangement comprising a voltage comparator and respective rectifier circuit means to derive from said signals appearing on said send and receive paths unidirectional voltage signals for application to respective inputs of said comparator, at least one of said rectifier circuit means comprises rectifier means to derive a unidirectional voltage which varies with variations in the instantaneous amplitude of the signals on the respective path and means effectively to subtract from said unidirectional voltage a voltage proportional to the mean level of said unidirectional voltage taken over a period of the order of seconds, whereby the effects of ambient noise on the operation of the voice switching arrangement are reduced.

Preferably the rectifier means comprises a differential amplifier having at least one semiconductor diode connected in a feedback path from its output to one of its inputs, and said voltage proportional to the mean level of said unidirectional voltage is arranged to be applied to another input of said amplifier effectively to subtract said proportional voltage from said unidirectional voltage.

A loudspeaking telephone instrument in accordance with the present invention will now be described by way of example with reference to the accompanying drawings, of which:

Loudspeaking telephone instruments incorporating voice-switching arrangements have been described, for example in United Kingdom Patent Specification NO. 879,836, in which voice-frequency signals obtained from send and receive paths within the instrument are rectified and compared to select on which of these paths voice-frequency signals shall be allowed to pass unattenuated at any one time, the choice usually favouring the signal of larger amplitude. The switching-in of an attenuator in the "non-selected" path allows for a reasonable amount of amplification in the selected path without the risk of setting up an oscillatory loop within the instrument by way of the hybrid transformer, the send and receive paths, whichever is the selected path, and loudspeaker-to-microphone acoustic coupling.

When the loudspeaking instrument is operating under high ambient noise levels due to traffic noise, machine noise or room noise the normal voice switching arrangement is biased towards voice signals from the noisy end, making it difficult for the user of the instrument at the other end of the line to break in during a conversation. In the present arrangement this unfair bias is reduced by subtracting from the rectified voice signals derived from each path, before application to the comparator, a voice proportional to the mean level of ambient noise signals, or these noise signals plus the accompanying speech signals, averaged over a period of, say, three to five seconds.

Figure 1:
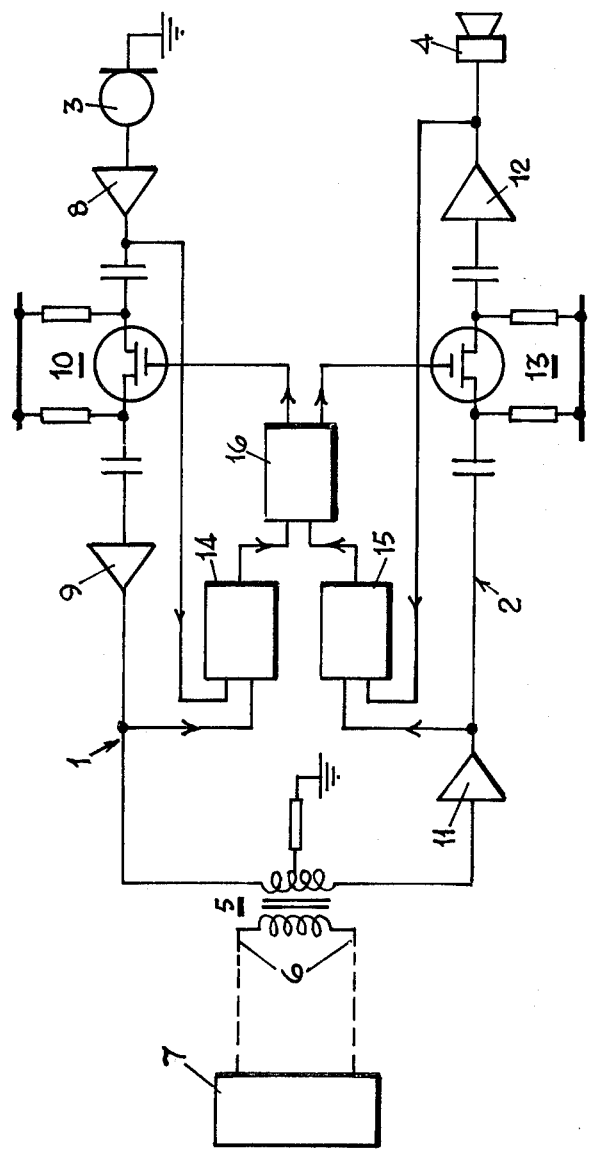
FIG. 1 shows the circuit of the instrument schematically.

Referring to FIG. 1 of the drawings, the telephone instrument in accordance with the present invention is generally similar to that described in United Kingdom Specification No. 879,836, comprising send and receive paths 1 and 2 by means of which a microphone 3 and a loudspeaker 4 respectively are connected to a hybrid transformer 5 and thereby to an associated telephone line 6 and local exchange 7. The send path 1 includes two amplifiers 8 and 9 and a fieldeffect transistor attenuator switch circuit 10, while the receive path 2 includes amplifiers 11 and 12 and a field effect transistor attenuator switch circuit 13.

Voice frequency signals from the outputs of the amplifiers 8 and 9, that is before and after the switch circuit 10, are applied to a first rectifying circuit 14, while voice frequency signals from outputs of the amplifiers 11 and 12 are applied to a second rectifying circuit 15. Unidirectional signals from the rectifier circuits 14 and 15 are applied to a comparator circuit 16, which in response to these unidirectional signals provides control voltage signals for the switch circuits 10 and 13 such as to switch one to a low attenuation condition and the other to a high attenuation condition.

Figure 2:
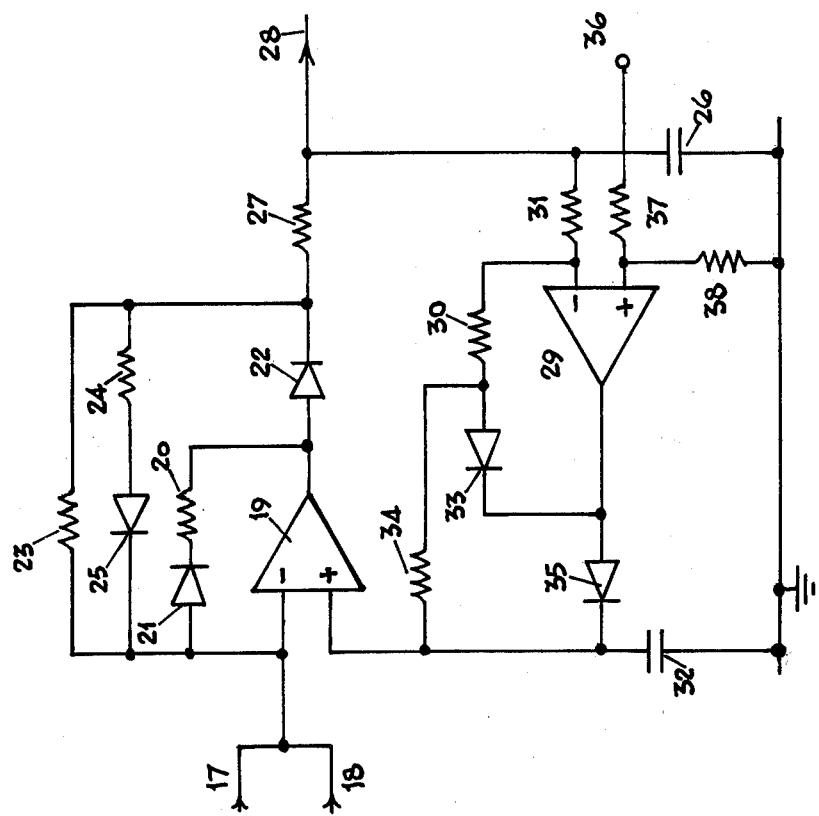
FIG. 2 shows part of the circuit of FIG. 1 in greater detail.

Referring now to FIG. 2 voice-frequency signals from the two points on, say, the send path 1 from the microphone to the hybrid transformer of the instrument are applied by way of paths 17 and 18 to the inverting input of an integrated circuit differential amplifier 19. The amplifier 19 is provided with a high level of negative feed-back for negative-going output voltages, by way of a resistor 20 and a diode 21, and a lower level of negative feedback for positive-going output voltages by way of a diode 22 and a resistor 23 in parallel with a resistor 24 and a diode 25. The resistor 24 and diode 25 provide a somewhat higher level of negative feedback for positive output voltages which are high enough to cause the diode 25 to conduct.

The amplifier 19 and its associated feedback circuits therefore act as a rectifying arrangement which in response to alternating signal voltages on the paths 17 and 18 charges a capacitor 26 to a positive voltage by way of a resistor 27, this positive voltage being applied to the respective input of the comparator 16 as shown in FIG. 1 by way of a path 28. The voltage across the capacitor 26 is also applied to the inverting input of a second differential amplifier 29 the gain of which is set to a value of, say, three by the relative values of resistors 30 and 31. The output of the amplifier 29 charges a capacitor 32 to a negative voltage by way of a diode 33 and a resistor 34. The time constant of the resistor 34 and the capacitor 32 is of the order of five seconds, and the voltage developed across the capacitor 32 tends towards the mean level of the output voltage of the amplifier 29 over such a period.

The negative voltage across the capacitor 32 is applied directly to the non-inverting input of the amplifier 19, so that a proportion of this "mean level" voltage is subtracted in the amplifier 19 from the unidirectional voltage resulting from the alternating voltages on the paths 17 and 18. In the present arrangement the feedback by way of the amplifier 29 reduces to approximately one quarter the voltage developed across the capacitor 10 due to the mean level of alternating current signals, compared with the voltage with no feedback.

During a continuous speech passage the mean level signal across capacitor 32 will tend towards the average of the speech-plus-ambient noise, so that once the speech has terminated the subtraction process would tend to overcompensate for the noise actually present but for the presence of a diode 35, which enables the capacitor 32 to discharge rapidly under such conditions. Thus when the voltage across the capacitor 26 falls rapidly at the end of a speech passage the consequent fall in the negative voltage at the output of the amplifier 29 reverse biases the diode 33 and thereby disconnects the negative feedback path. If the fall in voltage is sufficient the diode 35 is forward biased and the capacitor 32 then discharges into the output stage of the amplifier 29. In this way the mean level voltage on the capacitor 32 tends to average on the minima of the speech plus noise signal. An offset control voltage may be applied to the non-inverting input of the amplifier 29 by way of a terminal 36 and a potential divider comprising resistors 37 and 38.

The circuit arrangement described above with reference to FIG. 2 is of most use in the send side of the instrument, that is as the rectifying circuit 14 in FIG. 1, but with poor line terminations the speech plus noise leakage through the hybrid 5 to the receive side of the instrument can exceed the speech-only signal at the send side, forcing the voice switching arrangement into the receive mode. It is preferable therefore to have a noise subtraction circuit as shown in FIG. 2 on each path to the comparator 16, that is, in both rectifier circuits 14 and 15.

The components of the circuit arrangement shown in FIG. 2 of the drawing may have the following values:

| Resistor 20 | 3.3K ohms |
| Resistor 23 | 47K ohms |
| Resistor 24 | 16K ohms |
| Resistor 27 | 68 ohms |
| Resistors 30,34,37 | 100K ohms |
| Resistors 31,38 | 30K ohms |
| Capacitor 26 | 4.7 micro Farad |
| Capacitor 32 | 47 micro Farad |

I claim:

1. A loudspeaking telephone instrument including a voice switching arrangement by means of which in operation signals on a send path or a receive path selectively are substantially attenuated in dependence upon the relative amplitudes of the voice frequency signals appearing on said paths, the voice switching arrangement comprising a voltage comparator and respective rectifier circuit means to derive from said signals appearing on said send and receive paths unidirectional voltage signals for application to respective inputs of said comparator, wherein at least one of said rectifier circuit means comprises means to derive from the respective unidirectional voltage signal a voltage proportional to the mean level of that unidirectional voltage signal, and rectifier means to derive said respective unidirectional voltage signal from the voice frequency signals on the respective path and from said voltage proportional to said mean level, such that the effects of a continuing background noise on the level of said respective unidirectional voltage signal are reduced.

2. A loudspeaking telephone instrument in accordance with claim 1 wherein the rectifier means comprises a differential amplifier having at least one semiconductor diode connected in a feedback path from its output to one of its inputs.

3. A loudspeaking telephone instrument in accordance with claim 2 wherein the voltage proportional to the mean level of said unidirectional voltage is arranged to be applied to another input of said amplifier effectively to subtract said proportional voltage from said unidirectional voltage.

4. A loudspeaking telephone instrument in accordance with claim 3 wherein said proportional voltage is derived from said unidirectional voltage by means including a second amplifier.

5. A loudspeaking telephone instrument in accordance with claim 4 wherein said proportional voltage is set up across a capacitor forming part of an output circuit of said second amplifier, the output circuit having a time-constant of the order of three to five seconds, and there are provided means rapidly to discharge said capacitor following a fall in the value of said unidirectional voltage.

6. A loudspeaking telephone instrument including a voice switching arrangement by means of which in operation signals on a send path or a receive path selectively are substantially attenuated in dependence upon the relative amplitudes of the voice frequency signals appearing on said paths, the voice switching arrangement comprising a voltage comparator and respective rectifier circuit means to derive from said signals appearing on said send and receive paths unidirectional voltage signals for application to respective inputs of said comparator, wherein at least one of said rectifier circuit means comprises a. rectifier means including a differential amplifier having two inputs and at least one semiconductor diode connected in a feedback path from its output to one of its inputs,
b. means to apply voice frequency signals on the respective path to a first of the inputs of said differential amplifier,
c. circuit means to derive a voltage proportional to the mean level of the unidirectional voltage signal at the output of said rectifier means, and
d. means to apply said mean level voltage to the second of said inputs of said differential amplifier, so that the effects of a continuing background noise on the level of the respective unidirectional voltage signal are reduced.

7. A voice-switching loudspeaking telephone instrument comprising a microphone, a send path for voice-frequency signals interconnecting said microphone and line terminals of the instrument, a loudspeaker, a receive path for voice-frequency signals interconnecting said line terminals and said loudspeaker, first and second switch means connected respectively in said send and receive paths, a voltage comparator, first and second rectifier circuit means to derive from signals on said send and receive paths respective unidirectional voltage signals for application to respective inputs of said comparator, and means to control said first and second switch means in dependence upon outputs of said comparator, at least one of said rectifier circuit means comprising a. rectifier means including a differential amplifier having two inputs and at least one semiconductor diode connected in a feedback path from its output to one of its inputs, b. means to apply voice frequency signals on the respective path to a first of the inputs of said differential amplifier, c. circuit means to derive a voltage proportional to the mean level of the unidirectional voltage signal at the output of said rectifier means, and d. means to apply said mean level voltage to the second of said inputs of said differential amplifier, so that the effects of a continuing background noise on the level of the respective unidirectional voltage signal are reduced.

* * * * *